United States Patent

[11] 3,556,082

[72] Inventor Charles E. McCullough
 Austin, Tex.
[21] Appl. No. 480,855
[22] Filed Aug. 19, 1965
[45] Patented Jan. 19, 1971
[73] Assignee Columbia Scientific Industries Corporation
 Austin, Tex.
 a corporation of Texas, by mesne assignments

[54] METHOD AND APPARATUS FOR MEASUREMENT OF CARDIAC OUTPUT
 22 Claims, 4 Drawing Figs.
[52] U.S. Cl. .................................................. 128/2.05,
 73/194; 250/43.5, 250/44
[51] Int. Cl. ...................................................... A61b 5/02
[50] Field of Search ............................................ 128/2, 2.05,
 2; 73/227, 194, 206; 250/43.5, 44, 83.3

[56] References Cited
 UNITED STATES PATENTS
3,313,290 4/1967 Chance et al. ............... 128/2
3,334,788 8/1967 Hamilton ..................... 222/43

OTHER REFERENCES
"Kreislaofdiagnostik " published by Georg Thieme 1962 in Stuttgart, Germany Pages 22—28 Copy in 128—2.

Primary Examiner—William E. Kamm
Attorneys—Arnold, Roylance, Kruger & Durkee

ABSTRACT: A method and apparatus for determining the true cardiac output from a detected dilution curve having an exponential decay by integrating the area under the curve up to a predetermined point approximately where the detected equilibrium level differs from the true level; detecting the level and the slope of the natural logarithm of the curve at that point; combining the level and slope at the point to obtain a value equal to the area under an exponential curve representative of an extrapolated "true" curve; adding the two area signals to obtain the total area under the curve representing the true dilution and combining the total area signal with signals representative of the equilibrium level and blood volume to obtain the desired signal.

PATENTED JAN 19 1971 3,556,082

Charles E. McCulloug,
INVENTOR.

BY Arnold and Roylance
ATTORNEYS

METHOD AND APPARATUS FOR MEASUREMENT OF CARDIAC OUTPUT

The invention described herein was made in the performance of work under a NASA contract and is subject to the provisions of section 305 of the National Aeronautics and Space Act of 1958, Public Law 85-568 (72 Stat. 435; 42 U.S.C. 2457).

The invention concerns apparatus and methods which are suitable for use in determining cardiac output, as well as for other determinations.

The importance of the determination of cardiac output in promoting an adequate understanding of problems relating to the circulation in health and disease has long been recognized. This importance has been further emphasized by the advent of new environmental conditions to which man is subjected, such as weightlessness and high gravitational forces due to acceleration. Information concerning the dynamics of the cardiovascular system helps provide understanding of the capabilities of human or other animal performance for existence under varied environments. Although principles and techniques for measuring cardiac output have been well established and have been applied to man for some time, they have not heretofore been instrumented and simplified to a point of routine clinical use and acceptance.

The indicator dilution method for determining cardiac output is a useful tool which may be employed in accordance with the invention. In general, this method involves the injection of a suitable amount of indicator, such as an opaque dye or a radioactive material, into the blood of a host body at a location closely preceding the heart, and then detecting the indicator concentration at an appropriate sampling point to permit determination of the blood flow rate through the heart (cardiac output).

The radioisotope method will be principally referred to hereinafter, since it is particularly advantageous in that it eliminates the need for arterial sampling to determine indicator concentration, but the invention is applicable to all indicator dilution methods.

In man, a scintillation detector, such as a sodium iodide scintillation crystal detector, may be placed on the chest wall with the medial edge of the shield of the detector at the left lateral edge of the sternum, and the superior edge of this shield in the second intercostal space. Approximately 25 microcuries of radioiodinated serum albumin is then injected into a vein which will allow blood contained therein to empty into the right heart chamber. As the blood containing the radioactive material reaches the heart, the detector measures the concentration of radioactivity passing therethrough and exhibits a potential proportional to the concentration as a function of time. This time function, usually called an indicator dilution curve or flow curve, is hereinafter referred to as a dilution curve. The area under the curve is proportional to the radioactivity injected and to the detector counting volume, inversely proportional to flow (cardiac output) and inversely related to heart-to-detector distance. But the decay slope of the curve attains an equilibrium value and thus fails to return to zero because of recirculation of radioactivity. Thus, because of the equilibrium value one cannot simply integrate the dilution curve to obtain a proper indication of cardiac output.

The invention provides methods and apparatus which are capable of permitting direct reading of cardiac output in volume of blood per unit time pumped by the heart, such as in liters per minute. The invention provides further advantages in that it allows use of the radioisotope technique which avoids cardiac or arterial catheterization; the apparatus and methods are simple and do not require complicated analyses; the apparatus and methods produce reliable and reproducible results; and the apparatus is relatively inexpensive. In addition the techniques disclosed herein do not require arterial puncture; are not disagreeable to the patient; are rapid; and can be conducted in a variety of situations.

It has been determined that the decay portion of the dilution curve associated with measurement of cardiac output by the indicator dilution method decays exponentially to an equilibrium value greater that the exponentially extrapolated decay value. It has also been determined that calculation of cardiac output involves determination of the area under a dilution curve which decays exponentially to an equilibrium value, but which must be measured as if it decayed to the original base line according to the exponential curve.

The technique to be described combines standard electronic components in a manner which, by taking advantage of the properties of an exponential curve, allows determination of the area beneath the curve as extrapolated by relatively simple, straightforward, and inexpensive means. This is accomplished by effectively measuring the area under two individual portions of the dilution curve and then adding these two portions to obtain the total area under the curve.

Briefly, one apparatus in accordance with the invention suitable for permitting determination of cardiac output from a source of potential which produces a dilution curve with respect to time, comprises an input connectable with the source of potential, and integrating means associated with the input through a switch to permit integration of the potential until the switch breaks the association with the input.

A potential storage means is preferably associated with the input through a switch to permit retention of the potential at the time the switch breaks the association with the input. A relay may be employed to break the associations at the proper time as well as to start operation of the apparatus at the onset of a rise in potential from the source. Logarithmic amplifying means is also associated with the input to permit logarithmic amplification of the potential at least near the time the associations of the input with the integrating means and with the potential storage means are broken. The potential at the time the associations are broken is selected to be on the exponential decay portion of the dilution curve. Logarithmic amplification during this interval results in a ramp output. This ramp output is then differentiated by a suitable means to provide a decay slope potential representative of the slope of the exponential curve at least near the time the selected potential is stored.

A dividing means is then employed to divide the selected potential in the potential storage means by the potential output of the differentiating means, the quotient being proportional to the area under the decay portion of the dilution curve as extrapolated from the time the selected potential is chosen to infinity. Then, the first integral potential obtained by integrating the curve from zero time to the time of selected potential is added to the second integral potential obtained after the time of the selected potential to obtain a total integral potential proportional to the total area under the dilution curve as if it decayed to its exponentially extrapolated value.

Of course the principles disclosed herein are applicable to dilution curves associated with fluid in fluid flow lines other than those which decay exponentially to an equilibrium value different from the exponentially extrapolated value to the original base line. For example, other types of dilution curves which decay according to a known type of decay curve, such as a hyperbolic or parabolic curve, may be measured in accordance with the principles disclosed herein.

Figure 1:
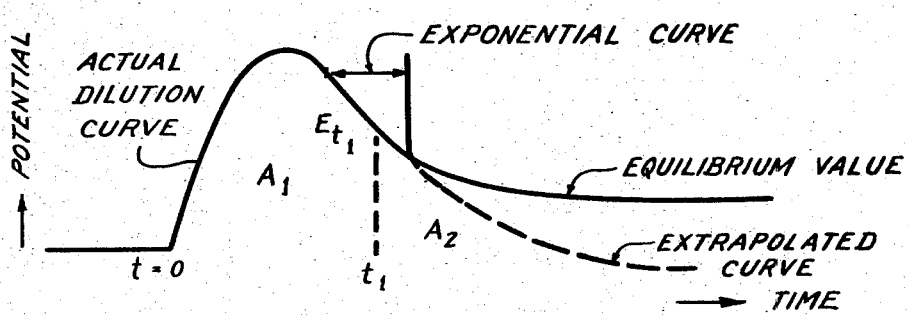
FIG. 1 is a schematic representation of a dilution curve which decays exponentially to an equilibrium value other than the exponentially extrapolated value.

With reference to FIG. 1, which illustrates basically, an actual dilution curve obtained in the measurement of cardiac output, $A_1$ is the area beneath the curve from zero time until a time of $t_1$ at which a voltage $E_{t_1}$ is measured. The area $A_1$ can be determined by employing standard integration techniques, for example, an operational amplifier integrator with appropriate control circuits for starting and stopping integration.

As shown $E_{t_1}$ is selected on the exponential decay portion of the pulse wave. The area $A_2$ beneath the decay curve as extrapolated after the time of $E_{t_1}$ may be determined by integrating this extrapolated curve from time $t_1$ to infinity. Because of the known characteristics of an exponential decay curve, the exponential decay curve is s described by the equation $E_{t_1}e^{-\alpha t}$ where $e$ equals 2,178, the natural logarithm base, and $\alpha$ is a measure of the decay slope. Integrating over the previously mentioned limits, one obtains:

$$A_2 = \int_{t_1}^{\infty} E_{t_1} e^{-\alpha t} dt = \frac{E_{t_1}}{\alpha}$$

Therefore, since $E_{t_1}$ and $\alpha$ are determinable at the time $E_{t_1}$ is chosen, $A_2$ can be immediately calculated following time $t_1$.

Figure 2:
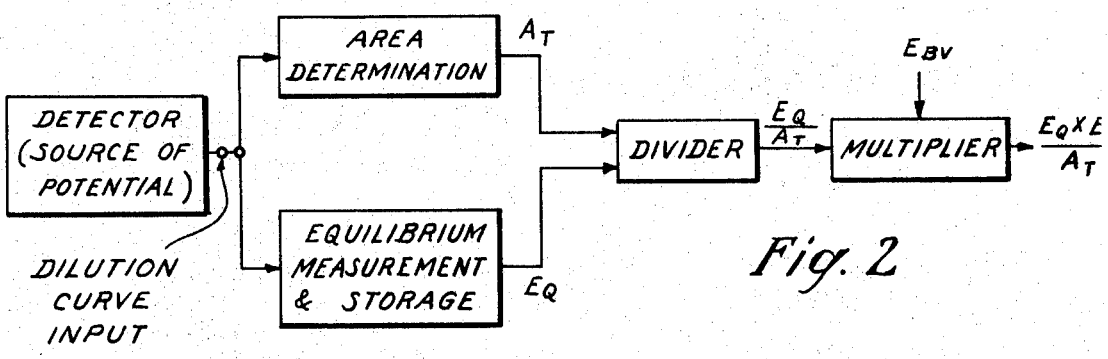
FIG. 2 is a schematic drawing of an apparatus embodying the invention suitable for use in the determination of cardiac output.

Apparatus suitable for determining cardiac output is shown in FIG. 2. As shown, a detector, such as a radioactivity detector or an opaque dye detector, produces a potential as a function of time, that is, a dilution curve. Ordinarily, a ratemeter or other suitable means is employed with the detector to help smooth what would otherwise be voltage pulses. This potential is fed to a dilution curve input connectable with the detector. Apparatus for determining a potential $A_T$ representative of the area under the dilution curve is connected with the input. This apparatus is specifically described hereinafter with respect to FIG. 3. The potential $A_T$ is fed to a divider.

Equilibrium measurement means, which may include storage means, is also connectable with the dilution curve input. Equilibrium measurement and storage means may comprise a capacitor along with a cathode follower. The voltage on the capacitor will follow the dilution curve, and at a time when the equilibrium value has been reached may be employed to provide a voltage $E_Q$ representative of the equilibrium value in the dilution curve. The voltage $E_Q$ is then fed to a divider. A proper equilibrium value may be assured by either waiting a sufficient period of time after the peak of the dilution curve and then indicating a proper time by operation of a manual or electronic switch, or measuring electronically when the dilution curve reaches a constant value and then indicating a proper time by operation of a switch.

The voltage $E_Q$ is then divided by the voltage $A_T$, which is inherently stored in the apparatus described hereinafter, to provide an output proportional to $E_Q/A_T$. This output is then multiplied by a potential $E_{BV}$ representative of blood volume in the host body to yield an output $\frac{E_Q \times E_{BV}}{A_T}$ proportional to cardiac output, which by suitable calibration procedures may be read or recorded directly in liters per minute or other suitable units. Of course, the order of the dividing and multiplying means can be reversed if so desired. Ganged potentiometers may be employed for these purposes.

The voltage $E_{BV}$ may be set into the apparatus by employing a tap off a potentiometer. Charts of blood volume in relation to the size of humans are available, which permit convenient setting of the tap on the potentiometer with respect to a particular person.

Figure 3:
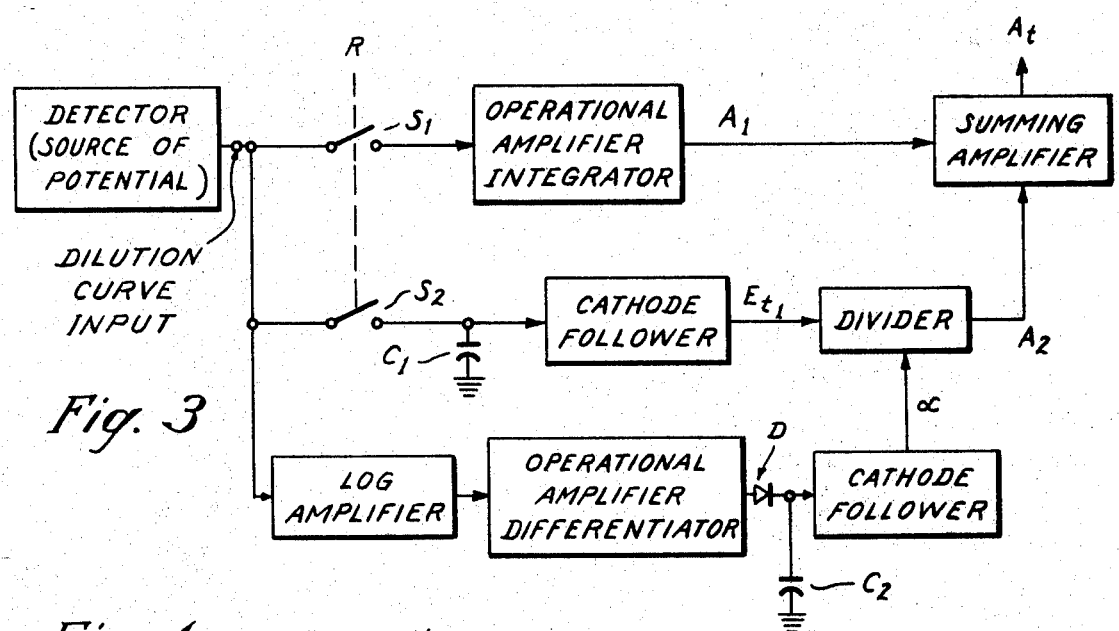
FIG. 3 is a schematic drawing of one embodiment of apparatus in accordance with the invention useful in the apparatus shown in FIG. 2.

With reference to FIG. 3, a detector or source of potential is connectable with an input to electronic apparatus for area determination. The source of potential may be derived from the output of a densitometer (indicator dilution method) or a count-rate meter (surface counting method). The potential supplied to the input proceeds through one or more switches $S_1$ and $S_2$ to an integrator, such as an operational amplifier integrator, and to storage of the potential $E_{t_1}$ obtained at the time the one or more switches $S_1$ and $S_2$ break the associations of these two components with the input. As shown, the storage of $E_{t_1}$ may be accomplished by a capacitor $C_1$ in combination with a cathode follower, which permits use of the potential stored on capacitor $C_1$ without discharging the capacitor.

Relay R operates the one or more switches $S_1$ and $S_2$ to close them when the detector exhibits a potential, and to open them when $E_{t_1}$ is selected. The relay R may be set to open one or more switches $S_1$ and $S_2$ a short time after the maximum value on the dilution curve is reached, such as by being triggered by a sufficient amount of decreasing voltage at the input, for example, by a predetermined percentage of the maximum amplitude of the dilution curve. Or the relay can be triggered when appropriate parameters indicate that the dilution curve is in the exponential region, thereby assuring accurate selection of $E_{t_1}$. In this regard, the differentiator output can be utilized to determine when the actual curve begins deviation from the exponential portion, since this output decreases in value at such time. This latter technique assures maximum accuracy and is therefore preferred.

Thus, the integrator integrates the potential supplied to the input until such time as a selected potential $E_{t_1}$ is reached and the relay operates the one or more switches $S_1$ and $S_2$ to cease integration and to store the potential $E_{t_1}$ on the capacitor $C_1$. The output $A_1$ is automatically stored in the integrator and is transmitted to an adder, such as a summing amplifier or other adding means. The output of the integrator $A_1$ is proportional to the area under the dilution curve from zero time until time $t_1$ when the relay R causes one or more switches $S_1$ and $S_2$ to break the circuits with the input.

Also connected with the input is a log amplifier which produces a ramp output during the exponential decay portion of the dilution curve. A differentiator, such as an operational amplifier differentiator, differentiates the ramp output to produce a potential proportional to the decay slope of the exponential portion of the decay curve. This decay slope potential, referred to hereinbefore as $\alpha$, may be stored, such as on a capacitor $C_2$ in combination with a cathode follower, before being fed to a divider. Since the maximum value of the downslope occurs during the exponential portion of the curve, the decay slope potential may be easily stored at its proper value by charging the capacitor $C_2$ through a diode D to the maximum value of the output voltage from the differentiator.

The divider divides the potential $E_{t_1}$ by the decay slope potential $\alpha$ to produce a potential proportional to the area $A_2$ beneath the exponential portion of the dilution curve as extrapolated, as shown in FIG. 1. The potentials $A_2$ and $A_1$ are fed to an adder, such as a summing amplifier, which produces a total integral potential $A_T$ proportional to the total area under the dilution curve as if it decayed exponentially to the original base line.

Figure 4:
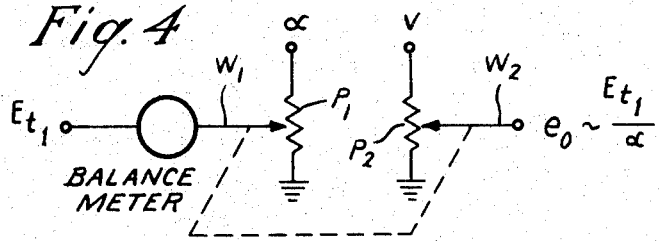
FIG. 4 is a schematic drawing of ganged potentiometers which may be employed in apparatus in accordance with the invention.

With reference to FIG. 4 a suitable dividing means for use in apparatus in accordance with the invention is shown. The divider comprises two ganged potentiometers, one of which ($P_1$) has the decay slope potential $\alpha$ connected through its total resistance to ground, and the other of which ($P_2$) has a constant voltage $v$ connected through its total resistance to ground. The potentiometer $P_1$ associated with the decay slope potential $\alpha$ has a slide wire or wiper $W_1$ having input $E_{t_1}$ which includes a balance meter. The wiper $W_1$ is ganged with the slide wire or wiper $W_2$ on the other potentiometer $P_2$ to provide operation in unison. The wiper $W_1$ is displaced until a null is obtained on the balance meter, at which point the displacement of wiper $W_2$ provides an output voltage $e_o$ proportional to $\frac{E_{t_1}}{\alpha}$, which in turn is proportional to $A_2$. Displacement of the wiper $W_1$ may be accomplished manually until the $\alpha$ null is obtained on the balance meter, or it may be accomplished electronically by standard techniques.

Thus, a total integral potential $A_T$ representative of the total area under the dilution curve as extrapolated to infinity can be quickly and easily obtained by an inexpensive combination of components. By employing the total integral potential $A_T$ with the other parameters necessary for the determination of cardiac output, as shown in FIG. 2, and with appropriate calibration procedures, the cardiac output can be read directly in liters per minute, or in such other volume per unit time as may be chose, by standard techniques.

The above principles may be employed for extrapolating and integrating other decay curves which decay to an equilibrium value other than the extrapolated value, by employing a selected potential on the decay curve, the determined slope at the selected potential, and the characteristics of the known type of curve. The technique disclosed herein a is also applicable to the measurement of dilution curves associated with fluid in fluid flow lines, such as may be found in the measurement of the flow of fluid by a passage of radioactive indicators injected therein.

I claim:

1. Apparatus suitable for permitting determination of cardiac output from an electrical source which produces a first electrical output representing a dilution curve with respect to time; said apparatus comprising input means connectable with said source; integrating means associated with the input means through switch means to permit integration of said first electrical output until the switch means breaks the association with the input means; differentiating means including amplifying means associated with the input means to produce a second electrical output related to the exponential slope of the first electrical output at least near the time the association of the input means with the integrating means is broken; means for providing a third electrical output related to the magnitude of the first electrical output at the time association of the input means with the integrating means is broken; means responsive to the second and third electrical outputs to produce a fourth electrical output directly related to the third and means inversely related to the second electrical output; and means for combining the output of the integrating means with said fourth electrical output to provide a combined output.

2. The apparatus defined in claim 1 wherein said integrating means comprises an operational amplifier integrator.

3. The apparatus defined in claim 1 wherein a potential storage means is associated with the output of the differentiating means for retention of the second electrical output.

4. The apparatus defined in claim 1 wherein the means responsive to the second and third electrical outputs comprises ganged potentiometers, one of which has an output proportional to the quotient of two inputs to the other.

5. The apparatus defined in claim 1 wherein said apparatus includes potential storage means associated with the input means through a switch to permit retention of the first electrical output at the time the association of the input means with the integrating means is broken, and to permit supply of this potential to the means responsive to the second and third electrical outputs, this potential being the third electrical output.

6. The apparatus defined in claim 5 wherein the associations of the input means with the integrating means and with the potential storage means are broken by at least one relay set to break the associations of the input means with the integrating means and with the potential storage means at virtually the same time.

7. The apparatus defined in claim 6 wherein said potential storage a means comprises a capacitance.

8. The apparatus defined in claim 6 wherein said relay is responsive to deviation of the second electrical output of the differentiating means from that produced during an exponential decay portion of the dilution curve.

9. The apparatus defined in claim 6 wherein said relay is responsive to a predetermined percentage decrease from the maximum amplitude of the dilution curve.

10. The apparatus defined in claim 1 wherein said apparatus includes means for measuring an equilibrium value of the dilution curve, means for providing a potential which may be representative of blood volume in cardiac output determination, and means for multiplying and dividing to obtain an output proportional to the equilibrium value of the dilution curve times the potential which may be representative of blood volume divided by the output of the combining means.

11. The apparatus defined in claim 1 wherein said electrical source comprises a radioactivity detector.

12. Apparatus suitable for permitting determination of the area under a dilution curve which decays according to a given decay curve to a value other than its extrapolated value; said apparatus comprising input means connectable with a source of potential which produces a dilution curve; first integrating means associated with the input means through a switch to permit integration of the potential until the switch breaks the association with the input; potential storage means associated with the input means through a switch to permit retention of the potential at the time the switch breaks the association with the input means; means associated with the input means for measuring the slope of the dilution curve at least near the time the associations of the input means with the first integrating means and with the potential storage means are broken; second integrating means for integrating the given decay curve from the time the associations of the input with the first integrating means and with the potential storage means are broken, by employing the potential in the potential storage means and the slope along with the characteristics of the given decay curve; and adding means for adding the outputs of the first integrating means and the second integrating means.

13. The apparatus defined in claim 12 wherein said apparatus includes means for measuring an equilibrium value of the dilution curve, means for providing a potential which may be representative of blood volume in cardiac output determination, and means for multiplying and dividing to obtain an output proportional to the equilibrium value of the dilution curve times the potential which may be representative of blood volume divided by the output of the adding means.

14. Apparatus suitable for permitting determination of cardiac output from a dilution curve associated with measurement of cardiac output; said apparatus comprising a radioactivity detector which produces potential proportional to radioactivity detected; an input means connectable with the output of the detector; and operational amplifier integrator associated with the input means through a switch to permit integration of the potential until the switch breaks the association with the input means; first potential storage capacitance associated with the input means through a switch to permit retention of the potential at the time the associations of the input means with the integrator and with the capacitance are broken; a logarithmic amplifier associated with the input means to permit logarithmic amplification of the potential at least near the time the associations of the input means with the integrator and with the capacitance are broken; a differentiator associated with the logarithmic amplifier for differentiating the output thereof; second potential storage capacitance for permitting retention of the potential output of the differentiator; a pair of ganged potentiometers, one of which is associated with the first potential storage capacitance and the second potential storage capacitance, the other of which has an output proportional to a quotient of the potential stored in the first potential storage capacitance as the dividend, and the potential stored in the second potential storage capacitance as the divisor; and adding means for adding the of the operational amplifier integrator and the output of the ganged potentiometers proportional to the quotient.

15. The apparatus defined in claim 14 wherein said apparatus includes means for measuring an equilibrium value of the dilution curve, means for providing a potential which may be representative of blood volume in cardiac output determination, and means for multiplying and dividing to obtain an output proportional to the equilibrium value of the dilution curve times the potential which may be representative of blood volume divided by the output of the adding means.

16. The apparatus defined in claim 15 wherein the associations of the input means with the operational amplifier integrator and with the first potential storage capacitance are broken by at least one relay set to break the associations of the input with the operational amplifier integrator and with the first potential storage capacitance at virtually the same time.

17. The apparatus defined in claim 16 wherein said apparatus includes a cathode follower associated with the output of the first potential storage capacitance, and a cathode follower associated with the output of the second potential 18. A method suitable for determining the area under a dilution curve which decays according to a given decay curve to a value other than its extrapolated value; which method comprises detecting a potential with respect to time which describes a dilution curve; integrating the potential with respect to time to obtain a first integral potential po proportional to the integral of the dilution curve until a selected potential on the given decay curve is reached; determining the slope of the decay curve at least near the selected potential; employing the slope, the selected potential, and the characteristics of the known type of decay curve to integrate the potential representative of the given decay curve from the time of the selected potential to infinity to obtain a second integral potential; and adding the first integral potential to the second integral potential to determine a potential proportional to the area under the dilution curve as if it decayed according to its known type.

19. A method suitable for determining the area under a dilution curve associated with a fluid in a fluid flow line, which dilution curve decays according to a given decay curve to a value other than its extrapolated value; which method comprises injecting into the fluid in a fluid flow line a radioactive material; detecting a potential proportional to radioactivity in the fluid flow line, which potential describes a dilution curve with respect to time; integrating the potential with respect to time to obtain a first integral potential proportional to the integral of the dilution curve until a selected potential on the given decay curve in the dilution curve is reached; storing the selected potential; determining the slope of the decay curve at least near the selected potential; employing the slope, the selected potential, and the characteristics of the given decay curve to integrate the potential representative of the given decay curve from the time of the selected potential to infinity to obtain a second integral potential; and adding the first integral potential to the second integral potential to determine the total integral potential proportional to the area under the dilution curve as if it decayed according to its known type; and employing the total integral potential to indicate the area under the dilution curve.

20. A method suitable for determining the area under a dilution curve which decays exponentially to a value other than the exponentially extrapolated value of the dilution curve to its base line; which method comprises detecting a potential as a function of time which produces a dilution curve; integrating the potential with respect to time to obtain a first integral potential proportional to the integral of the dilution curve until a selected potential on the exponential decay portion of the dilution curve is reached; storing the selected potential; logarithmically amplifying the decay potential on the exponential decay portion to form a ramp output; differentiating the ramp output to determine a decay slope potential proportional to the decay slope of the exponential decay portion of the dilution curve; dividing the stored selected potential by the decay slope potential to obtain a second integral potential proportional to the integral of the exponential decay portion of the dilution curve from the time of the selected potential to infinity; and adding the first integral potential and the second integral potential to provide a total integral potential proportional to the area under the dilution curve as if it decayed exponentially to its base line.

21. A method suitable for determining the area under a dilution curve associated with a fluid in a fluid flow line which decays exponentially to a value other than the exponentially extrapolated value of the dilution curve to its base line; which method comprises injecting a radioactive material into the fluid flow line; detecting a potential proportional to the radioactivity passing in the fluid flow line, which potential describes a dilution curve with respect to time; integrating the potential with respect to time to obtain a first integral potential proportional to the integral of the dilution curve until a selected potential on the exponential decay portion of the dilution curve is reached; storing the selected potential; logarithmically amplifying the decay potential on the exponential decay portion of the dilution curve to form a ramp output; differentiating the ramp output to determine a decay slope potential proportional to the decay slope of the exponential decay portion of the dilution curve; dividing the stored selected potential by the decay slope potential to obtain a second integral potential proportional to the integral of the exponential decay portion of the dilution curve from the time of the selected potential to infinity; adding the first integral potential and the second integral potential to provide a total integral potential proportional to the area under the dilution curve as if it decayed exponentially to its base line; and employing the total integral potential to indicate the area under the dilution curve associated with the fluid flow line.

22. A method for determining cardiac output by measurement of the dilution curve associated with measurement thereof which decays exponentially to a value other than the extrapolated value to its base line; which method comprises injecting a radioactive material into the blood of the host; detecting a potential proportional to the radioactivity concentration associated with cardiac output, which potential describes a dilution curve with respect to time; integrating the potential with respect to time to obtain a first integral potential proportional to the integral of the dilution curve until a selected potential on the exponential decay portion of the dilution curve is reached; storing the selected potential; logarithmically amplifying the decay potential on the exponential decay portion of the dilution curve to form a ramp output; differentiating the ramp output to determine a decay slope potential proportional to the decay slope of the exponential decay portion of the dilution curve; dividing the selected potential by the decay slope potential to obtain a second integral potential proportional to the integral of the exponential decay portion of the dilution curve from the time of the selected potential to infinity; adding the first integral potential and the second integral potential to provide a total integral potential proportional to the area under the dilution curve as if it decayed exponentially to its base line; and employing the total integral potential to indicate cardiac output.